Aug. 13, 1940.    R. A. BRADEN    2,211,091
SUPERREGENERATIVE MAGNETRON RECEIVER
Filed Jan. 31, 1938    5 Sheets-Sheet 4
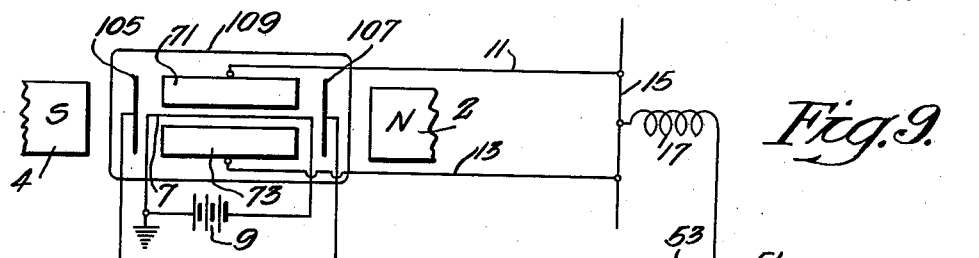
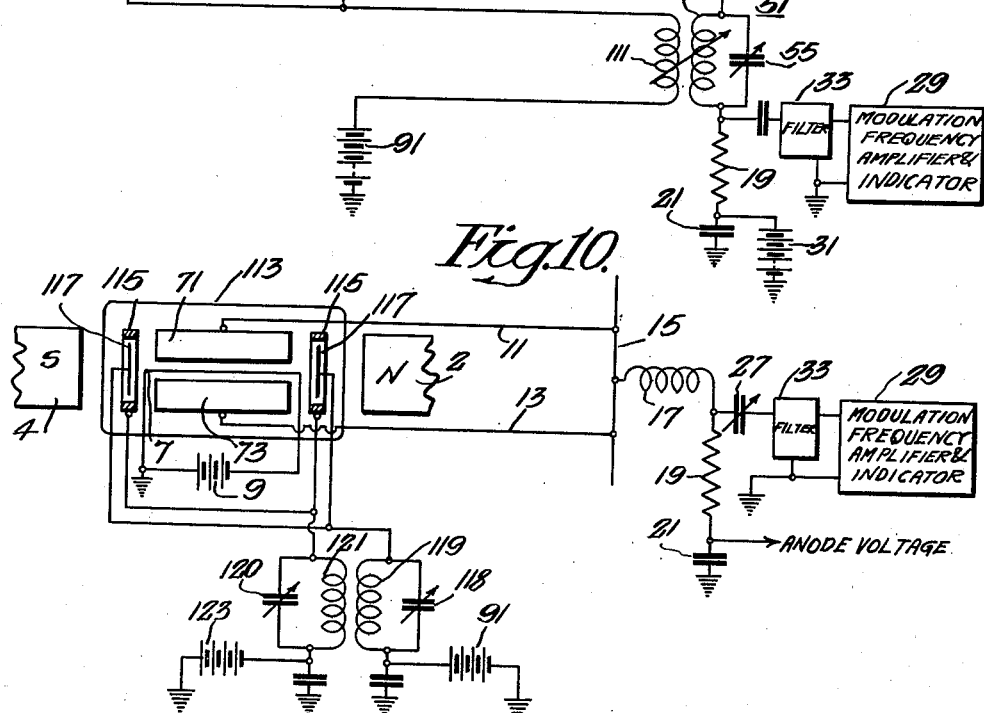
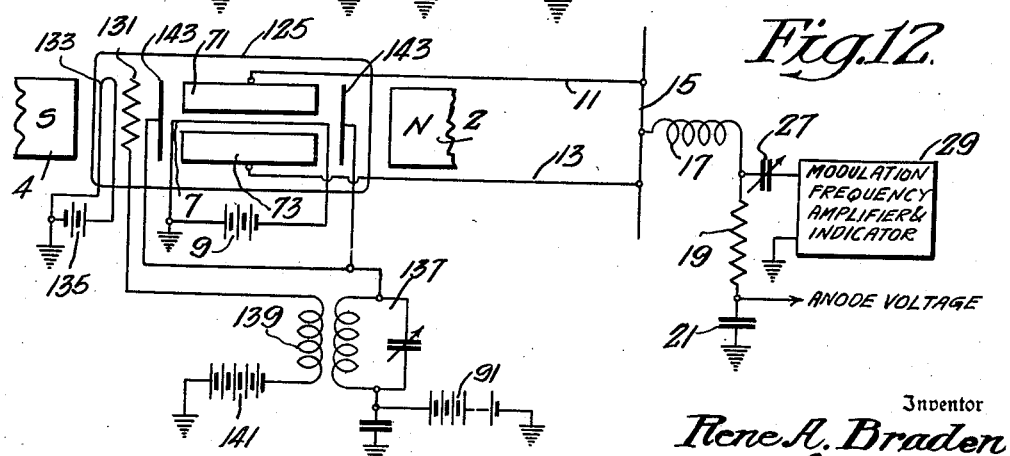
Inventor
Rene A. Braden
Attorney

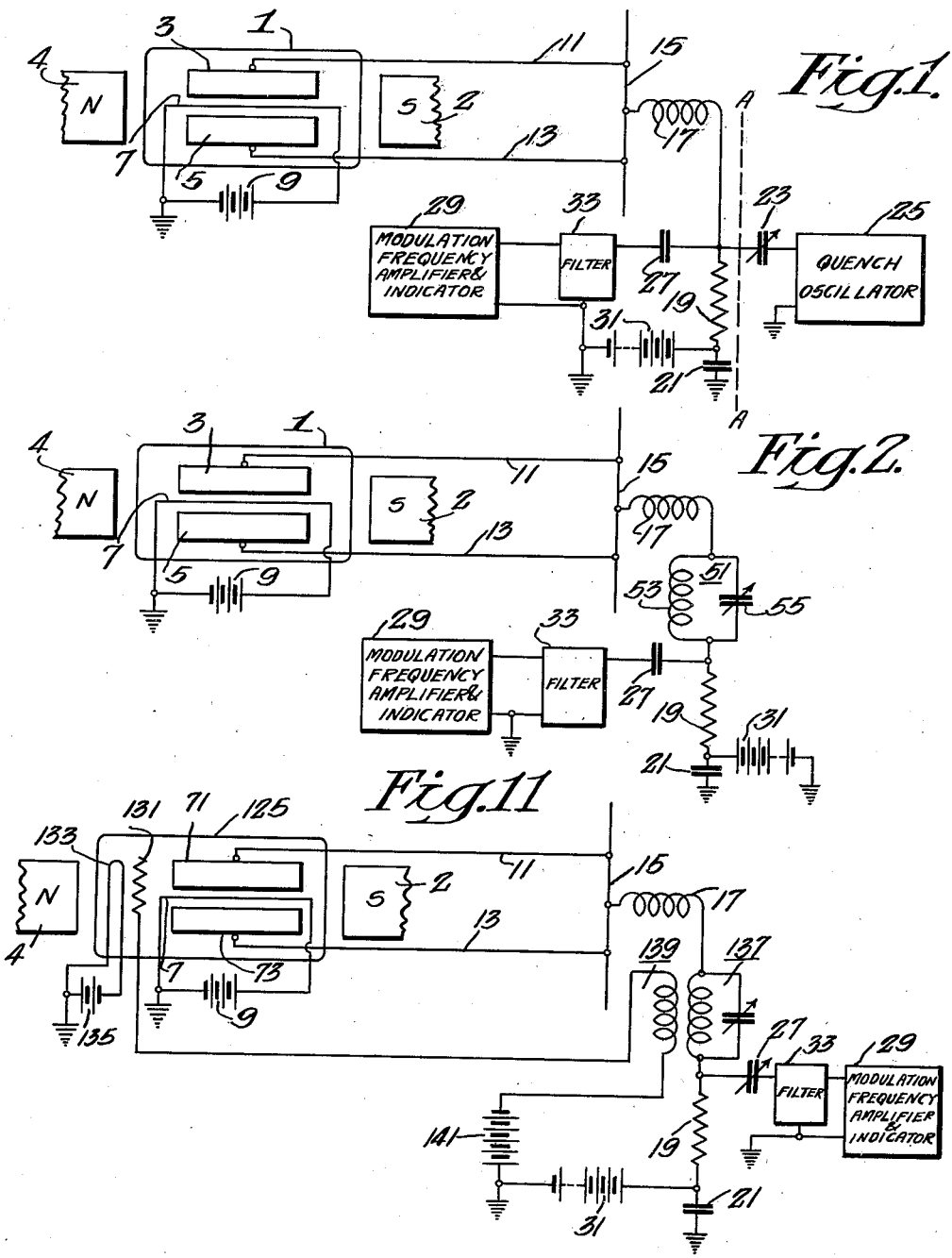

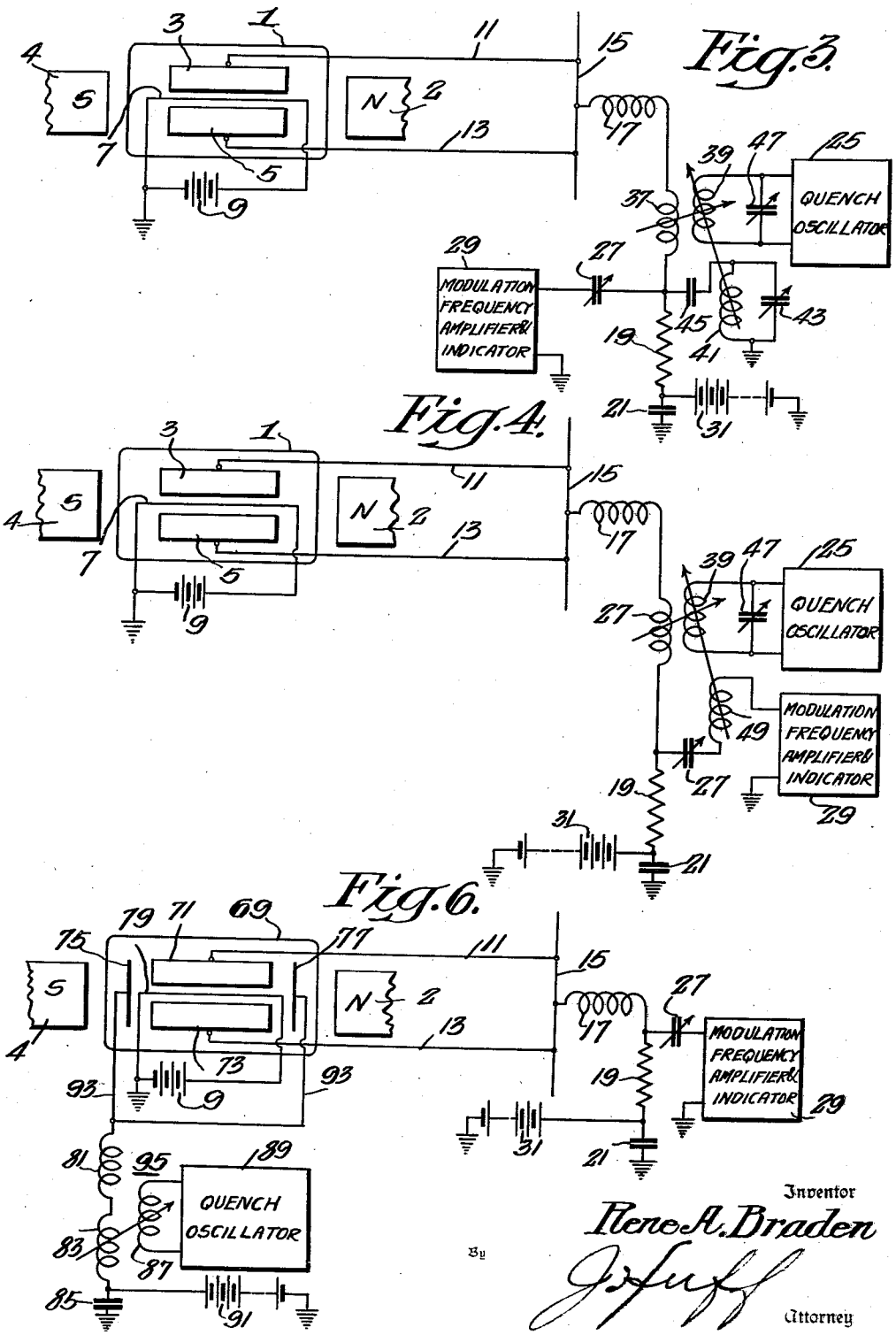

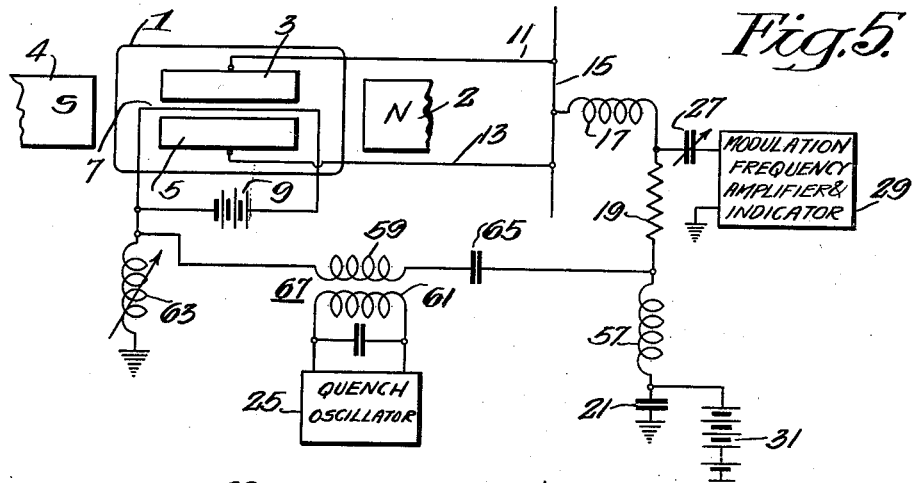
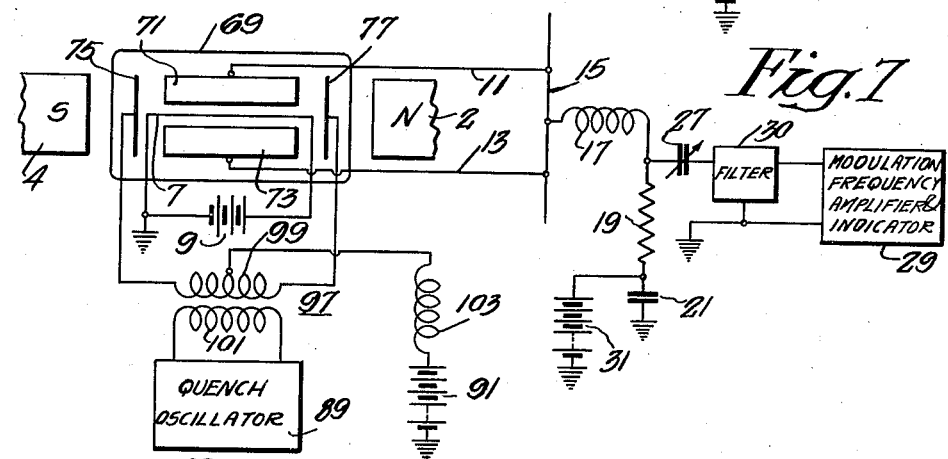
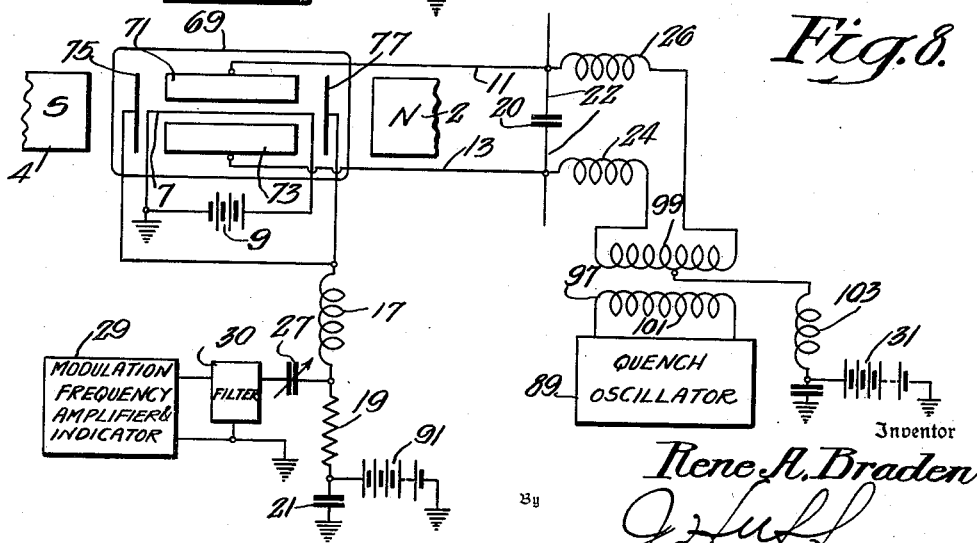

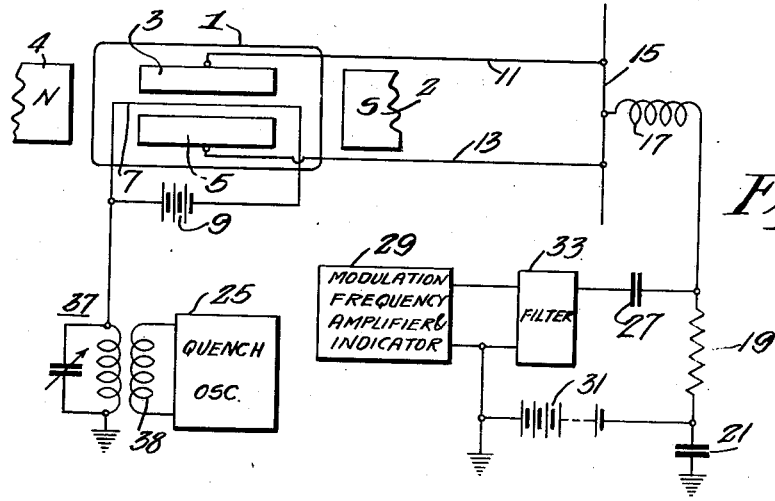
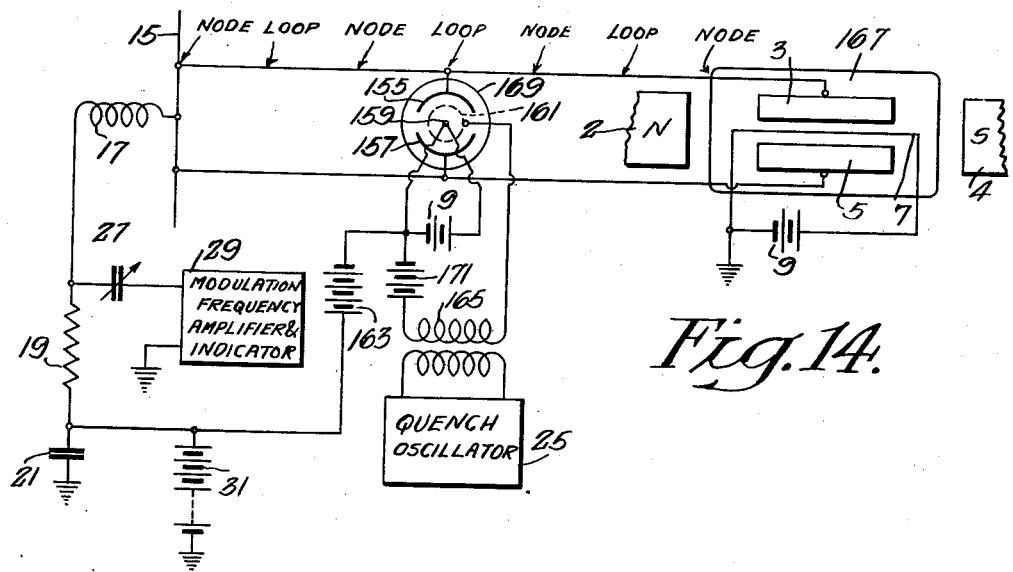

Patented Aug. 13, 1940

2,211,091

UNITED STATES PATENT OFFICE 2,211,091

SUPERREGENERATIVE MAGNETRON RECEIVER

Rene A. Braden, Collingswood, N. J., assignor to Radio Corporation of America, a corporation of Delaware Application January 31, 1938, Serial No. 187,942

8 Claims. (Cl. 250—20)

My invention relates to ultra short wave receivers, and more particularly to a receiver having a superregenerative magnetron detector.

The practice of superregeneration as applied to thermionic detectors operating in the usual range of radio signalling frequencies is well known. I have discovered that the conditions causing superregeneration which results in the increased sensitivity of an oscillating detector can be applied to a magnetron. Essentially these conditions are met by a detector which is capable of self-oscillation when suitable values of electrode potentials are applied and in which oscillations are interrupted by periodic variations of the electrode potentials.

It is an object of this invention to provide means for obtaining superregeneration in a magnetron.

In its simplest form, a magnetron detector is essentially a two-electrode device. In consequence, the signal input circuit, the quench voltage circuit, and the modulation frequency output circuit are all attached to the same pair of electrodes. This results in the direct application of quench voltages to the modulation frequency amplifier. The amplifier is consequently overloaded so that it does not effectively amplify the demodulated signal.

It is therefore a further object of my invention to provide means for protecting the modulation frequency amplifier of a superregenerative magnetron detector from being overloaded by the quench frequency oscillations.

Another object is to provide means for generating quenching voltages in a magnetron oscillator.

A further object is to provide means for applying quenching voltages to magnetrons having auxiliary electrodes.

My invention will be better understood from the following description when considered in connection with the accompanying drawings. Its scope is indicated by the appended claims.

Referring to the drawings:

Figure 1 is a circuit diagram of an ultra short wave receiver in which an oscillating magnetron detector is quenched by an auxiliary oscillator through variations in the magnetron anode voltage;

Fig. 2 is a circuit diagram of a magnetron detector in which a negative resistance characteristic of a magnetron is used to provide self-excited quench oscillations;

Figure 3 is a circuit diagram representing an alternative method of applying the quenching voltage to the magnetron, and at the same time balancing the quench voltage out of the audio amplifier;

Figure 4 is a modification of Fig. 3;

Figure 5 is a schematic diagram of a portion of a magnetron receiver in which the quench voltage is kept out of the amplifier by a balanced bridge circuit;

Figure 6 represents a superregenerative endplate magnetron detector in which an in-phase quenching voltage is applied to the end-plates;

Figure 7 is the same as Fig. 6 except that an out-of-phase quenching voltage is applied to the end-plates;

Figure 8 is another circuit for quenching an end-plate magnetron detector and for protecting the modulation frequency amplifier from the quench frequency voltages.

Figure 9 is a schematic diagram of a self-excited end-plate magnetron detector, in which the end-plates are used to obtain feedback for generating quench frequency voltages.

Figure 10 is a schematic diagram of a double end-plate magnetron in which the end-plates constitute the quench frequency oscillating electrodes;

Figure 11 is a schematic diagram of an alternative type of magnetron detector in which a second emissive cathode and a grid provide regenerative feedback to the anodes for the generation of quench frequency oscillations;

Figure 12 is a schematic diagram of a splitanode magnetron detector in which quench frequency oscillations are generated in auxiliary electrodes;

Figure 13 is a schematic diagram of a magnetron oscillator in which quench voltages are applied to the cathode; and Figure 14 shows a method for causing superregeneration by means of a variable impedance across the oscillator.

Similar numerals refer to similar parts throughout the several drawings.

Referring to Fig. 1, a split anode magnetron tube is shown at 1 having anodes 3 and 5, emissive cathode 7 heated by a battery 9, one terminal of which is grounded. A magnetic field parallel to the cathode is indicated by the pole pieces 2 and 4 of a magnet which is not shown. A tunable transmission line 11, 13 connects the anodes to a dipole antenna 15. Tuning is accomplished by varying the length of 11 and 13. The mid-point of the antenna is serially connected to the positive terminal of a potential source, such as battery 31, through a choke coil 17 and a resistor 19. The battery 31 has its negative terminal grounded, and may be bypassed by a capacitor 21. The junction of resistor 19 and choke 17 is connected through a small coupling capacitor 23 to a source 25 of quench frequency oscillations, and also through a coupling capacitor 27 and a filter 23 to the input of a modulation frequency amplifier 29. With the exception of the filter 33, that portion of the device shown to the left of the dotted line A—A is a well-known form of magnetron receiver.

Ultra short wave signals are received on the antenna 15, and fed to the magnetron anodes through the transmission line. A voltage corresponding to the modulation of the received signal is developed across the resistor 19 by the detection which occurs in the magnetron. This voltage is then impressed on the modulation frequency amplifier and indicator 29 through the filter 33. To the right of line A—A a quench frequency oscillator is represented by 25. This oscillator may be of any type which will supply a quench voltage whose frequency is less than the frequency of the received signal. The output of this oscillator is impressed across resistor 19 through capacitor 23. Since the quench currents change the voltage drop across the anode resistor the anode potential is varied, and this interrupts or "quenches" the signal frequency oscillations at the quench frequency.

The quench voltage is usually comparatively high. Should it be impressed directly across the amplifier, the grid of the first amplifier tube would be driven positive during a portion of the cycle, and below negative cut-off during a portion of the cycle. This would cause distortion, a reduction of gain, or complete blocking of the amplifier. The purpose of the filter 33 is to prevent the quench frequency voltage from reaching the amplifier 29. The filter may be designed in the usual manner to provide low pass characteristics for audio modulations, or band pass characteristics for high frequency modulations. In either case it should present a high degree of attenuation to the quench frequency voltage.

Self-generated quench oscillations are obtained in the modification shown in Fig. 2. A shunt resonant circuit 51, comprising an inductor 53 and a capacitor 55, is inserted in the anode lead to the magnetron between resistor 19 and choke 17. The quench oscillator and capacitor 23 of Fig. 1 have been eliminated in the instant circuit. By virtue of the negative resistance characteristic of the magnetron, quenching oscillations are generated whose frequency is determined by the resonant frequency of the resonant circuit 51. These quenching oscillations occur simultaneously with the ultra short wave oscillations and, as a result, the anode potential is varied, interrupting the latter oscillations at the frequency of the former. Increased sensitivity due to the superregenerative action results as in the preceding case.

In Fig. 3 the basic magnetron circuit is the same as that shown in Figs. 1 and 2. A secondary 37 of a transformer is inserted in series with the anode lead between choke 17 and resistor 19. This secondary is energized at quench frequency by its primary 39 and the quench frequency oscillator 25. Since the quench frequency voltage is in series with the anode potential source, the signal frequency oscillation of the magnetron is interrupted at the quench frequency.

The filter illustrated in Figs. 1 and 2 has been replaced by a compensating circuit which consists of inductor 41, a shunt capacitor 43, and a small coupling capacitor 45. This compensating circuit impresses a voltage across resistor 19 equal and oppositely phased to the undesired voltage which is set up by the varying anode current. The amplitude of the compensating voltage is varied by changing the coupling between inductors 39 and 41, and its phase angle varied by adjusting capacitor 43. Capacitor 45 is preferably small so that the impedance across resistor 19 is a maximum.

Fig. 4 shows a variation of Fig. 3 in which the quench voltage is coupled into the anode through transformer 37, 39 as before, but in which a compensating voltage is obtained by coupling from the primary 39 to an inductor 49 which is in series with the input to the modulation frequency amplifier. It is connected so that the voltage developed across it is equal and opposite to the quench voltage which appears across resistor 19.

Fig. 5 is a schematic diagram of another method of applying quenching voltages for superregenerative magnetron detection without interfering with the modulation frequency amplifier performance. A split-anode magnetron 1 is shown as in the preceding figures. The emissive cathode 7 is heated by a battery 9. One end of the cathode is grounded through a variable inductor 63. The anodes 3 and 5 are connected through the transmission line 11, 13 to the dipole antenna 15. The mid-point of this antenna is serially connected to the positive terminal of battery 31 through a choke 17, a resistor 19, and an inductor 57 in that order. The modulation frequency output is taken from the junction of choke 17 and resistor 19. The junction of resistor 19 and inductor 57 is connected to the ungrounded end of inductor 63 through a blocking capacitor 65 and the secondary 59 of a transformer 67. The primary 61 of transformer 67 is energized by the quench frequency oscillator 25. Inductors 57 and 63 with resistor 19 and the anode-cathode resistance of the magnetron 1 constitute a bridge circuit which may be balanced so that no quench voltage appears across the input to the modulation frequency amplifier.

Fig. 6 illustrates an embodiment of my invention in which the quenching voltage is applied to the end plates of an end-plate magnetron 69. Two anode sections 71 and 73 are connected to the antenna 15 through the transmission line 11, 13. The mid-point of the antenna is connected to the positive terminal of the anode voltage supply through choke 17 and resistor 19. The demodulated output is taken from the junction of choke 17 and resistor 19 through capacitor 27. The two end plates 75 and 77 are connected together by leads 93 and to the positive terminal of a battery 91 through a choke 81 and the secondary 83 of a transformer 95. The quenching voltage is then induced in series with the fixed potential from 91 by the oscillator 89 and transformer 95. Since an increase in end-plate potential causes an increase in end-plate current and a decrease in anode current, and vice versa, the quenching frequency may also appear in the modulation frequency amplifier. Precautions must be taken to prevent this. The methods explained above in connection with Figs. 1, 3, 4 and 5 may be applied to end-plate magnetrons also, and need not be considered again.

Fig. 7 shows a method of protecting the modulation frequency amplifier from the quench voltage which has particular application to an end-plate magnetron. Except for the end-plate connections, the usual magnetron circuit is shown. The quenching voltage from the oscillator 89 is applied through a push-pull transformer 97 out of phase to the two end plates 75 and 77. The mid-point of the secondary 99 of this transformer is connected through a choke 103 to the positive terminal of the source of end-plate potential 91. Consequently, at any instant the modulating effect of one end plate on the anode current is partially cancelled by the equal and opposite effect of the other end plate. At the same time the signal frequency oscillations are interrupted twice in each quench frequency cycle. A voltage of twice the quench frequency appears across resistor 19, but its amplitude is not as great as that of the fundamental quench frequency. A further advantage is derived from the increased separation between the signal modulation frequencies and the quench frequency. A filter may be designed to separate more efficiently the desired signal from the undesired when the difference between them is great.

I have found that other combinations are possible; for example, the quench voltage may be applied to the anode, and the demodulated signal taken from the end plates, as shown in Fig. 8. A capacitor 20 is inserted in the center of a split antenna 22. This capacitor presents negligible impedance to signal frequencies, but a high impedance to quench frequencies. Two choke coils 24 and 26 are provided through which the out-of-phase quench voltage is applied to anodes 71 and 73 from the secondary 99. A voltage of twice the quench frequency appears across resistor 19 as in Fig. 7, and similarly may be attenuated by a filter 30.

Other combinations which may be employed include applying the quenching voltage simultaneously in opposite phase to the two end plates, and to the two split anodes in proper magnitude and phase to effect a balance with respect to the total current to the split anodes. Or the signal may be applied to either pair of electrodes in phase, and the detected signal taken out of the remaining pair, in phase.

Figure 9 is a schematic diagram of another method of obtaining superregenerative detection with an end plate magnetron. A regenerative feedback coupling to the end plates 105 and 107 has been provided which includes the mutual coupling between inductor 53, which is in the anode circuit, and inductor 111, which is connected between the end plates and the end-plate battery 91. One, or both, of these inductors may be tuned by a variable capacitor. When the magnetic coupling between inductor 111 and inductor 53 is properly phased, quenching oscillations will be generated at frequency which is determined by the resonant frequency of one, or both, of the tuned circuits. As before, the variation of anode potential interrupts the ultra short wave oscillations at the quench frequency, and superregenerative detection results.

In Fig. 10 is shown a superregenerative magnetron detector circuit which employs a magnetron 113 having an additional electrode associated with each end plate which is preferably an annular electrode 115. The end-plate battery 91 supplies a positive potential to both end plates 117 through an inductor 119. A battery 123 supplies a negative potential to the electrodes 115 through an inductor 121 inductively coupled to 119. One or both of these inductors may be tuned, as by capacitors 118 and 120. Quench oscillations are generated between these electrodes at the resonant frequency of one, or both, of the tuned circuits. The varying potential on the end plates 117 interrupts the signal frequency oscillations of the magnetron to produce superregeneration. While the annular electrodes 115 have been shown concentric to and in the plane of the end plates 117, they are not limited to that position, nor indeed are they to be limited to the annular shape illustrated. They may take the form of grids and be placed, for example, between the end plates 117 and the anodes 71, 73.

A further variation of the method of obtaining quenching oscillations is shown in Fig. 11. A split anode magnetron 125 is provided with a second emissive cathode 133 and a grid 131. The grid is negatively biased by a battery 141 and coupled to the anode circuit through inductor 139 coupled to a shunt tuned circuit 137 in the anode circuit. The cathode 133, the grid 131 and the anodes 71, 73 function as a triode thermionic tube. Regenerative feedback at the quench frequency is produced by the proper phasing of the coupled circuits 139 and 137, and quenching oscillations are produced at a frequency determined by 137. This, again, results in a variation of the anode potential which quenches the signal frequency oscillation to produce superregeneration.

Fig. 12 shows a still further variation in which two end plates 143 are added to the magnetron of Fig. 11. The resonant circuit 137 is now in series with the end-plate potential source 91, and is coupled to a grid inductor 139. The second cathode 133, grid 131 and end plates 143 perform thermionic triode functions to generate quench frequency oscillations. The modulation frequency output is taken from the anodes in the usual manner.

Fig. 13 illustrates a method of applying the quench frequency voltage to a magnetron which greatly reduces the quench voltage appearing across the amplifier. The antenna 15, transmission lines 11 and 13, choke 17 and the modulation frequency system including the amplifier 29 and filter 33 are shown in the conventional manner. Superregeneration is obtained by inserting the quench voltage in series with the ground lead of cathode 7 by means of a resonant circuit 37 coupled to the source 25 by an inductor 38. Instead of superimposing quench voltages on the anode potential directly, an effective change is obtained by varying the potential of the cathode. Since the quench voltage is introduced across the cathode-anode impedance and resistor 19 in series, and since resistor 19 represents but a fraction of the total impedance, the proportion of the quench voltage across 19 and the amplifier is greatly reduced.

In Fig. 14 a quenching of the signal frequency oscillations is obtained by means of a damping tube 169 connected to a voltage loop in a transmission line 151, 153 between an antenna 15 and a magnetron detector 167. This tube may be a magnetron or other thermionic tube. The transmission line is resonant at signal frequency. It is of sufficient length to provide the proper matching between antenna and oscillator and in addition to have available at least one voltage loop. Tube 169 is preferably connected to the transmission line at a voltage loop by very short leads. The anode electrodes 155 and 157 may be incorporated as a section of the transmission line instead of being attached by separate leads. While the tube 169 may be operated as a negatively biased, positive plate triode, I prefer to operate it with a positive grid and a small positive or negative bias on the anodes.

Demodulated signals are obtained as before. Choke 17, resistor 19 and battery 31 are connected in series between the mid-point of the antenna 15 and ground. A coupling capacitor 27 connects the modulation frequency amplifier 29 to the resistor 19. Tube 169 consists of two anode electrodes 155 and 157 which are respectively connected to lines 151 and 153. A cathode 159 is energized by a battery 9. An accelerating grid 161 which is between the cathode and the anodes is connected to one terminal of inductor 165. The remaining terminal is connected through a source of grid potential 171 to one side of the cathode. The anodes are at a high positive potential with respect to ground. A battery 163 is connected between one side of the cathode and the high side of battery 31. The polarity and potential of battery 163 may be adjusted to obtain the desired cathode-anode voltage.

The potential of accelerating grid 161 is varied by the quench frequency oscillations which are impressed on it from an oscillator 25. The effect of this is to vary the shunt impedance of the tube 169 across the transmission line. The short-circuiting effect which is produced in the magnetron 167 interrupts its signal frequency oscillations at the quench frequency, and superregeneration takes place.

While I have shown the damping tube 169 connected across the transmission line at a voltage loop it would also be effective if coupled to this point by a resonant transmission line of suitable characteristics.

I have thus shown how the sensitivity of an ultra short wave magnetron detector may be greatly increased by an application of the principles of superregeneration, and I have shown how the quenching oscillations may be generated by the magnetron tube itself, and I have shown various methods of protecting the audio system from the effect of excessive quench frequency voltages.

I claim:

1. The combination including means receptive to radio frequency signals, a magnetron detector oscillating at said signal frequency, means for impressing said signals on said detector, means for periodically interrupting said signal frequency oscillations, means for indicating the demodulated signal resulting from said detection, and means for reducing the interruption frequency impulses in said indicating means.

2. The combination including resonant means receptive to modulated radio frequency signals, a magnetron having cathode and anode electrodes, means including said magnetron for producing local oscillations at said radio frequency, means for impressing said radio frequency signals on said anode electrodes, a source of quench oscillations whose frequency is less than said radio frequency, a source of energizing potential, means including a resistor connecting said energizing potential to said anodes, means for impressing said quench frequency oscillations across said resistor so that the effective anode energizing potential is varied at said quench frequency to interrupt said magnetron radio frequency oscillations and produce superregenerative detection of said modulated radio frequency signals, a modulation frequency amplifier, an indicator, a modulation frequency pass filter, and means including said filter connecting said amplifier across said resistor.

3. The combination which includes means receptive to radio frequency signals, a magnetron detector oscillating at signal frequency and having cathode and anode electrodes, means for impressing said radio frequency signals on said anode electrodes, a source of quench frequency oscillations, and means including said source for varying the potential of said cathode at the quench frequency whereby said signal frequency oscillations are periodically interrupted and superregenerative detection established.

4. The combination including means receptive to radio frequency signals, a magnetron having cathode and anode electrodes and oscillating at said signal frequency, means for impressing said signals on said detector, means including said anode electrode for periodically interrupting said signal frequency oscillations to produce superregenerative detection, means for indicating said detected signal, and means for reducing the interruption frequency impulses in said indicating means.

5. The combination including means receptive to radio frequency signals, a magnetron having cathode and anode electrodes and oscillating at said signal frequency, means for impressing said signals on said detector, means including said anode electrode for periodically interrupting said signal frequency oscillations to produce superregenerative detection, means for indicating said detected signal, and means for reducing the interruption frequency impulses in said indicating means, said reducing means comprising means connected to said indicator and coupled to said interrupting means for applying a compensating voltage to said indicator.

6. The combination including means receptive to radio frequency signals, a magnetron having cathode and anode electrodes and oscillating at said signal frequency, means for impressing said signals on said detector, means including said anode electrode for periodically interrupting said signal frequency oscillations to produce superregenerative detection, means for indicating said detected signal, and means for reducing the interruption frequency impulses in said indicating means, said reducing means comprising means connected to said indicator and coupled to said interrupting means for applying a voltage to said indicator equal in amplitude and opposite in phase to said interruption frequency impulses.

7. The combination including means receptive to radio frequency signals, an ultra high frequency detector oscillating at said signal frequency, means for impressing said signals on said detector, means for periodically interrupting said signal frequency oscillations to produce superregenerative detection, means for indicating said detected signal, and means for reducing the interruption frequency impulses in said indicating means, said reducing means comprising means connected to said indicator and coupled to said interrupting means for applying a compensating voltage to said indicator.

8. The combination including means receptive to radio frequency signals, a magnetron having cathode and anode electrodes and oscillating at said signal frequency, means for impressing said signals on said detector, means for periodically interrupting said signal frequency oscillations to produce superregenerative detection, means for indicating said detected signal, and means for reducing the interruption frequency impulses in said indicating means, said reducing means comprising means connected to said indicator and coupled to said interrupting means for applying a compensating voltage to said indicator.

RENE A. BRADEN.